United States Patent Office 3,294,737
Patented Dec. 27, 1966

3,294,737
ORGANOPOLYSILOXANES
Karl Krantz, Schenectady, N.Y., assignor to General
Electric Company, a corporation of New York
No Drawing. Filed Dec. 23, 1963, Ser. No. 332,853
3 Claims. (Cl. 260—46.5)

This invention relates to organopolysiloxanes, especially the production of copolymers with arylsilsesquioxane polymer segments.

The arylsilsesquioxane polymers, such as those used in the present invention, are distinguished by their structure which resembles that of a ladder. The $RSiO_{1.5}$ units are arranged in a structure which may be represented as:

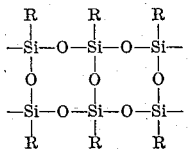

where R is aryl. The polymers are thus characterized by recurring units of the formula:

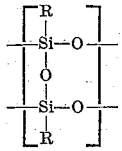

They may therefore be called arylsilsesquioxane ladder polymers, and the term ladder polymer will be used throughout this specification to describe these arylsilsesquioxane ladder polymers. The aryl group represented by R can be, for example, phenyl, cyanophenyl, benzoylphenyl, paraphenoxyphenyl, tolyl, xylyl, ethylphenyl, naphthyl, biphenyl, etc.

Arylsilsesquioxane ladder polymers have previously been shown, for example, in the patents to Sprung et al., 3,017,385, and Brown, Jr., et al., 3,017,386, assigned to the same assignee as the present invention. While the chain length, and thus the intrinsic viscosity, of these polymers has varied over wide ranges, in each case the chain was terminated by essentially unreactive groups, particularly the arylsilsesquioxane groups themselves. Thus, the previous ladder polymers were unusable, or only difficultly usable, as intermediates in the formation of other resinous polymers containing the arylsilsesquioxane ladder unit as an integral part.

While the arylsilsesquioxane ladder polymers of the prior art are valuable because of the properties of the ladder structure, even more useful material can be obtained by copolymerizing modified ladder polymers with other organosilicon compounds. The development of hydroxyl-terminated arylsilsesquioxane ladder polymers, as described and claimed in my copending application, Serial No. 332,947, filed concurrently herewith and assigned to the same assignee as the present invention, provided an available means for the production of copolymeric siloxanes containing arylsilsesquioxane segments. In particular, in accordance with the present invention, it has been found that hydroxyl-terminated ladder polymers can be reacted with other organosilicon compounds which have hydroxyl or chloro chain terminals, especially dichloropolysiloxanes and silanol chain-stopped polysiloxanes to form block copolymers wherein at least two of the blocks comprise arylsilsesquioxane polymer blocks. The reactions of the hydroxyl-terminated arylsilsesquioxane ladder polymers with monomeric silanes and silanols and with short chain length dichloropolysiloxanes and short chain length silanol chain-stopped polysiloxanes to form graft copolymers are disclosed and claimed in my copending application Serial No. 332,948, filed concurrently herewith and assigned to the same assignee as the present invention. Further, the self-condensation of hydroxyl-terminated arylsilsesquioxane polymers to form longer chain length polymers is disclosed and claimed in my copending application Serial No. 332,897, filed concurrently herewith and assigned to the same assignee as the present invention.

It is an object of this invention to produce block copolymers comprising arylsilsesquioxane polymer segment blocks joined by other organosiloxane blocks.

Briefly, this invention involves the production of block copolymers containing arylsilsesquioxane polymer segments. These block copolymers are formed by reacting hydroxyl-terminated arylsilsesquioxane polymer segments with organosilicon monomers or polymers containing silicon-bonded chlorine atoms or hydroxyl radicals. The reaction is carried out in a solvent solution under conditions suitable to the particular type of condensation reaction taking place. The final polymer product is purified and recovered from the solution for final use.

The hydroxyl-terminated arylsilsesquioxane ladder polymer segments utilized in this invention are those described in my aforementioned copending application Serial No. 332,947. The polymers described in that application are arylsilsesquioxane ladder polymer segments having the formula:

(1) 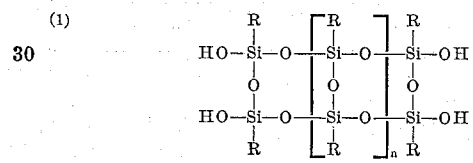

The polymers of the above formula have intrinsic viscosities of from about 0.05 to 0.5 or 1.0 dl./g. In the formula, R represents an aryl radical as previously defined and $n$ has a value of at least 25, e.g., from about 25 to 300 or 500, which values of $n$ correspond, respectively, to the intrinsic viscosities previously mentioned.

The organosilicon materials with which the ladder polymer segments are reacted to prepare the block copolymers within the scope of the present invention include diorganosilanes having the formula:

(2) $(R')_2Si(X)_2$ and organopolysiloxanes having the average formula:

(3) 

where X is a member selected from the class consisting of halogen and hydroxy, R' is a member selected from the class consisting of monovalent hydrocarbon radicals, halogenated monovalent hydrocarbon radicals and cyanoalkyl radicals, $a$ has a value of from 0.001 to 2.0, $b$ has a value of from 0.5 to 2.0 and the sum of $a$ plus $b$ is from 1.0 to 3.0. In addition, up to about 50% of the R' groups can be hydrogen. Illustrative of the radicals represented by R' of Formulas 2 and 3 are, for example, alkyl radicals, e.g., methyl, ethyl, propyl, butyl, octyl, octadecyl, etc. radicals; aryl radicals, e.g., phenyl, napththyl, tolyl, xylyl, etc. radicals; aralkyl radicals, e.g., benzyl, phenylethyl, etc. radicals; alkenyl radicals, e.g., vinyl, allyl, etc. radicals; cycloaliphatic radicals, e.g., cyclohexyl, cycloheptyl, cyclohexenyl, etc. radicals; halogenated monovalent hydrocarbon radicals, e.g., chloromethyl, dibromophenyl, trifluoromethylpropyl, trifluoromethylphenyl, etc. radicals; cyanoalkyl radicals, e.g., cyanomethyl, alpha-cyanoethyl, beta-cyanoethyl, beta-cyanopropyl, gamma-cyanopropyl, delta-cyanobutyl, etc. radicals. The preferred radicals represented by R' of Formulas 2 and 3 are the methyl and phenyl radicals. The organopolysiloxanes of Formula 3 are further characterized by the presence of at least two of the X groups per molecule.

The diorganosilanes within the scope of Formula 2 are well known in the art and typical members of such class are, for example, dimethyldichlorosilane, methylphenyldichlorosilane, methyl - beta - cyanoethyldichlorosilane, methyl - beta - cyanoethylsilanediol, diphenylsilanediol, methylphenylsilanediol, methylvinyldichlorosilane, etc. The organopolysiloxanes within the scope of Formula 3 are also well known in the art and comprise organopolysiloxanes containing at least two silicon atoms and generally more than two silicon atoms. These organopolysiloxanes within the scope of Formula 3 can comprise a plurality of different types of siloxane units, such as, for example, $SiO_2$ units, $R'SiO_{1.5}$ units, $(R')_2SiO$ units, and $(R')_3SiO_{0.5}$ units, provided that the units are combined in sufficient proportions to provide an organopolysiloxane of the average formula shown in Formula 3 and which contains at least two silicon-bonded X groups per molecule. One particularly useful class of organopolysiloxanes within the scope of Formula 3 are the chain-stopped polydiorganosiloxanes characterized by the formula:

(4)          $X[(R')_2SiO]_m(R')_2SiX$ where $R'$ and $X$ are as previously defined and $m$ is an integer equal to at least 1, e.g., from 1 to 1,000 or more, and preferably from 1 to 100.

As previously mentioned, the reaction of the present invention is carried out in solvent. More particularly, the arylsilsesquioxane ladder polymer segments and the organosilicon compound of Formulas 2 or 3 are dissolved in any material which is a solvent for the two reactants and which is inert to the reactants under the conditions of the reaction, and the reaction to form the block copolymers of the present invention is effected. The most suitable solvents for effecting the reaction are the aromatic hydrocarbons, with benzene and toluene being the preferred materials. In general, the solvent is used in an amount equal to at least the minimum required to form a uniform solution of the two reactants. Depending upon the particular reactants employed, this minimum can be as low as one part solvent per part of the other two reactants. Most often, suitable solutions are obtained when the solvent is present in an amount equal to from about 1 part solvent to 500 parts solvent per part of the ladder polymer segments and the organosilicon reactants in the reaction mixture.

The proportions of the ladder polymer segments and the organosilicon compound of Formula 2 or Formula 3 can also vary within fairly wide limits. In general, however, the organosilicon compound is selected and employed in an amount no greater than the amount required to provide one mole of silicon-bonded X groups from the organosilicon compound per mole of silicon-bonded hydroxyl groups in the ladder polymer segment. As the ratio of silicon-bonded X groups in the organosilicon compound increases, especially for those compositions within the scope of Formula 4 wherein $m$ has a value of from 1 to 3 or for those compounds within the scope of Formula 2, the tendency of the reaction mixture is to form increasing amounts of the graft copolymers described in my aforementioned copending application Serial No. 332,897. An ideal ratio of organosilicon compound within the scope of Formula 2 or Formula 3 is the amount required to provide from 0.25 to 1.0 mole silicon-bonded X groups per mole of silicon-bonded hydroxyl groups in the ladder polymer segments.

While the basic reaction utilized in the formation of the block copolymers of the present invention is similar whether the X groups of Formula 2 or Formula 3 are chlorine or hydroxyl, there is some minor variation in procedure. Thus, when the compound of Formula 2 contains X groups which are chlorine, the reaction mixture also includes a hydrogen chloride acceptor, since the reaction between the silicon-bonded chlorine atoms and the hydroxyl groups of the ladder segments involves the liberation of hydrogen chloride and the formation of siloxane linkages. Suitable acid acceptors include the typical tertiary amines such as pyridine, picolines, quinoline or an N,N-dialkylaniline. In practice, the ladder polymer segments are first dissolved in the particular solvent being employed in the reaction, an acid acceptor is then added to the solution and the chlorine-containing compound within the scope of Formula 2 or Formula 3 is added to the reaction mixture. Since the reaction is spontaneous, the reaction mixture is merely allowed to stand for several hours and the resulting copolymer is recovered, for example, by fractional precipitation.

When the organosilicon reactant of Formula 2 or Formula 3 is one in which the X groups are hydroxyl, the organosilicon compound is simply added to the solution of the ladder segments and heating of the reaction mixture at a temperature in the range of from about 80 to 110° C. causes the formation of the block copolymers within the scope of the present invention. However, to facilitate the reaction, a basic catalyst is often added to the reaction mixture. One of the preferred catalysts is tetramethyl ammonium acetate but other quaternary ammonium compounds which are weakly basic can also be employed. In addition, certain stronger basic catalysts such as piperidine, triethanolamine, 1,4 - diazabicyclo - (2,2,2) octane can also be employed. In general, the catalyst is employed in the amount of from about .01 to .1% by weight catalyst based on the weight of the ladder polymer segments. In forming the reaction mixture with the catalyst, the components of the reaction mixture are mixed together at room temperature, the basic catalyst is employed and the reaction mixture is heated to the reaction temperature and the reaction proceeds in a matter of several hours. At this time, the reaction mixture is cooled and the block copolymers within the scope of the present invention are separated as previously described.

The block copolymers of the present invention can be best illustrated graphically by equating the nucleus derived from detaching two molecules of water from the arylsilsesquioxane ladder polymer segments employed as starting materials in the present invention by the letter "A" and by designating the nucleus obtained by withdrawing either two chlorine atoms or a molecule of water from one of the organosilicon compounds of Formula 2 or Formula 3 by the letter "Z." In Formula 5 below is shown the first designation.

(5) 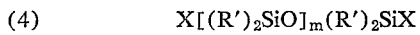

where $R$ and $n$ are as previously defined. The simplest type of block copolymer within the scope of the present invention is that composed of two arylsilsesquioxane units and one unit derived from the silane or organosilicon compound of Formula 2 or Formula 3. Such copolymer would have the formula:

(6) 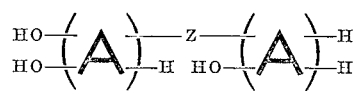

Likewise, a copolymer can contain two units derived from the arylsilsesquioxane ladder polymer segments and two units derived from the organosilicon compound. Such material would have the formula:

(7) 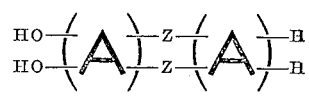

It is obvious that an infinite number of combinations of the arylsilsesquioxane nuclei represented by "A" and the organisilicon compound nuclei represented by "Z" are possible. These compositions can be described broadly as block copolymers in which each molecule contains at least two nuclei derived from arylsilsesquioxane ladder polymer segments and at least one nucleus derived from an organosilicon compound within the scope of Formula 2 or Formula 3. One particularly useful type of copolymer is that prepared from arylsilsesquioxane ladder polymer segments and the diorganosilanes of Formula 2 which leads to block copolymers in which the various "Z" units are $(R')_2SiO$ units.

The following examples are illustrative of the practice of my invention and should not be considered as limiting in any way the full scope of the invention as covered by the appended claims.

*Example I*

A quantity of hydroxyl-terminated phenyl ladder polymer segments (0.1608 gm.) having an intrinsic viscosity in benzene at 25° C. of 0.11 dl./g. and corresponding to Formula 1 when R is phenyl and $n$ has an average value of 60 was dissolved in 15 ml. of benzene containing 0.5 ml. of pyridine which had been dried over a molecular sieve. The flask containing this solution was sealed with a polytetrafluoroethylene film and a solution containing 0.05 ml. of dimethyldichlorosilane in 3.5 ml. of benzene was added dropwise through the film via a hypodermic needle. After standing overnight, the flask was shaken with a 5% aqueous citric acid solution and then with water in order to remove the pyridine and hydrolyze the excess chlorosilane. The copolymer was isolated by precipitation from the benzene solution using 3.0 volumes of hexane, and was then washed with hexane and redissolved in benzene. It was again precipitated with 3.0 volumes of hexane and the block copolymer was recovered. The copolymer was cast from benzene as a hard, transparent film having an intrinsic viscosity in benzene at 25° C. of 0.17 dl./g. and having an infrared spectrum showing the phenyl ladder structure in the presence of dimethylsiloxane units. This block copolymer was composed principally of units having the formula:

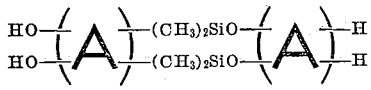

where "A" is as defined in Formula 5, when R is phenyl and $n$ has an average value of 60. As would be expected this block copolymer contained at least a trace of silanol units as evidenced by the following steps carried out on the copolymer. The copolymer was catalyzed with a benzene-methanol solution of tetramethylammonium acetate, the onium compound constituting about 1.0% of the weight of the siloxane product. The solution was evaporated to dryness and baked at 150° C. The ultimate product was totally soluble in benzene, and had an increased intrinsic viscosity of 0.29 dl./g. in benzene at 25° C. This increased molecular weight was due to condensation of the silanol chain terminals.

*Example II*

A solution was prepared containing 1.2585 gm. of the phenyl ladder polymer segments of Example I, which had an intrinsic viscosity of 0.11 dl./g. in benzene at 25° C., in 5.0 ml. of benzene. The flask containing the solution was sealed with a polytetrafluoroethylene film and the solution stirred with a magnet bar also coated with polytetrafluoroethylene. A solution of 0.10 ml. of dimethyldichlorosilane in 2.2 ml. of benzene was added dropwise during a period of 75 minutes. The mixture was stirred for 30 additional minutes and stored for 16 hours. The resulting block copolymer was isolated as in Example I and showed an intrinsic viscosity in benzene at 25° C. of 0.21 dl./g. and formed hard, clear films. The product of this example showed infrared spectra similar to the spectrum of the product of the preceding example. This copolymer was composed principally of molecules having the formula:

where "A" is as defined in Formula 5 when R is phenyl and $n$ has an average value of 60.

*Example III*

A solution was prepared containing 10 ml. of benzene, 0.5 ml. pyridine, and 0.1389 gm. of the hydroxyl-terminated phenyl ladder polymer segments described in Example I and having an intrinsic viscosity in benzene at 25° C. of 0.11 dl./g. For reaction with this ladder polymer a chlorine chain-stopped polydimethylsiloxane fluid having the average formula

$Cl[(CH_3)_2SiO]_9(CH_3)_2SiCl$ was used. Over a 20 minute period 0.05 ml. of this fluid was added to the ladder polymer solution with stirring. The reaction mixture stood overnight and thereafter a block copolymer was isolated as in the preceding examples. This block copolymer was composed principally of molecules consisting of a plurality of arylsilsesquioxane blocks as shown in Formula 5 for "A" when R is phenyl and $n$ is an average of 60, and at least some copolymerized polydimethylsiloxane units containing on the average 10 silicon atoms and being derived from the chlorine chain-stopped fluid used as a starting material. When cast from benzene this copolymer formed hard, clear films and had an intrinsic viscosity in benzene at 25° C. of 0.145 dl./g. The infrared spectra showed the phenyl ladder structure and strong methyl-silicon bands. When the procedure of this example was repeated except that the pyridine was omitted, the infrared spectrum of the final product showed no dimethylsiloxane. Further, the intrinsic viscosity of the product was 0.098 dl./g. in benzene at 25° C., slightly lower than the intrinsic viscosity of the phenyl ladder polymer.

*Example IV*

Under conditions similar to those used in Example I, 0.025 ml. of methylphenyldichlorosilane contained in 0.5 ml. benzene was reacted with a pyridine-containing benzene solution having therein 0.1168 gm. of the hydroxyl-terminated phenyl ladder polymer described in Example I. The product block copolymer showed an intrinsic viscosity, under the same conditions, of 0.16 dl./g. and formed hard, clear films. The infrared spectra of the copolymer showed the phenyl ladder structure and, additionally, an 8.0 micron methyl-silicon band. This block copolymer had the formula:

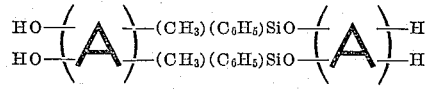

where "A" is as defined in Formula 5, when R is phenyl and $n$ has an average value of 60.

*Example V*

In this example the phenyl ladder polymer described in Example I was reacted with a liquid, chlorine chain-stopped polymethylphenylsiloxane containing an average of about 13 silicon atoms per molecule. A solution of 2.3 gm. of the siloxane in 10 ml. of benzene and 0.5 ml. pyridine was added to a stirred solution of 0.2411 gm. of the phenyl ladder polymer dissolved in 25 ml. of benzene and 0.5 ml. of pyridine. The method of recovering the copolymer was the same as that utilized in the previous examples. The ultimately obtained product had a weight of 0.2704 gm. and a content of units having the structure $(CH_3)(C_6H_5)SiO$ of at least 10.8 weight percent. The copolymer had an intrinsic viscosity in benzene at 25° C. of 0.155 dl./g. and, when cast from benzene, formed clear, hard films. This block copolymer comprised principally molecules consisting of a plurality of "A" blocks as defined in Formula 5 when R is phenyl and $n$ is an average of 60 and at least some polymethylphenylsiloxane blocks containing an average of 13 silicon atoms. When the product of this example was heated with tetramethylammonium acetate, in a manner similar to that described in Example I, a benzene soluble block copolymer having an intrinsic viscosity in benzene at 25° C. of 0.21 dl./g. was obtained.

*Example VI*

In this example, the polymethylphenylsiloxane utilized in Example V was reacted with a hydroxyl-terminated phenyl ladder polymer having an intrinsic viscosity in benzene at 25° C. of 0.37 dl./g. This ladder polymer corresponded to the material of Formula 1 when R is phenyl and $n$ has an average value of 190. A solution containing 2.00 gm. of the siloxane fluid was reacted with a solution containing 0.2244 gm. of the phenyl ladder polymer. The recovered block copolymer, after a double hexane precipitation, weighed 0.2372 gm. and showed at least 5.4 weight percent of methyl-phenyl siloxane units. Its infrared spectra and physical properties were similar to those of the product of Example V. The intrinsic viscosity of the final copolymer was 0.41 dl./g. This block copolymer contained a plurality of blocks "A" of Formula 5 where R is phenyl and $n$ has an average value of 190, and blocks of polymethylphenylsiloxane containing an average of 13 silicon atoms per block.

*Example VII*

In this example, the organosilicon reactant was a 60 percent by weight solids solution in toluene and butanol of a resinous methylpolysiloxane prepared from methyltrichlorosilane and dimethyldichlorosilane. This resin had the average formula:

$$(HO)_{0.03}(CH_3)_{1.1}SiO_{1.41}$$

had an average of more than two hydroxyl groups per molecule and had an intrinsic viscosity in benzene at 25° C. of 0.06 dl./g. The silsesquioxane ladder polymer had an intrinsic viscosity in benzene at 25° C. of 0.11 dl./g. and corresponded to Formula 1 when R is phenyl and $n$ has the average value of 60. A solution containing 0.20 gm. of the ladder polymer was dissolved in 6 ml. benzene and to this was added 2.5 ml. of the silicone resin. As a catalyst, a solution of 0.0030 gm. of tetramethylammonium acetate in a mixture of 1 ml. methanol and 2 ml. benzene was added to the ladder-resin solution. The resulting solution was heated with stirring in a small flask at 95° C. The reaction mixture was refluxed for 45 minutes, during which period butanol from the silicone resin and acetic acid were distilled out, along with part of the benzene. More benzene was added periodically to hold the working volume at about 4 to 5 ml. The crude final product was diluted to 9 ml. with benzene and a solvent fractionation was performed, using 27 ml. methanol to precipitate the copolymer. This precipitate was dissolved in 4 ml. benzene and again precipitated with methanol to produce a block copolymer having an intrinsic viscosity in benzene at 25° C. of 0.23 dl./g. Infrared analysis of this copolymer showed bands corresponding to monomethyl siloxane units, monophenyl siloxane units, and the 8.8 and 9.55 micron bands which correspond to the ladder structure. This copolymer contained about 35 mole percent of its silicon atoms in blocks corresponding to the "A" units of Formula 5 when R is phenyl and $n$ has the average value of 60 and about 65 mole percent in blocks derived from the starting silicone resin. Flexible, optically clear films of the block copolymer were cast from benzene.

*Example VIII*

In this example, arylsilsesquioxane ladder polymer segments similar to those employed in Example VII were condensed with a silanol-containing methylphenylpolysiloxane resin. The resin had been prepared from a mixture of organochlorosilanes consisting of 7.5 mole percent methyltrichlorosilane, 27.5 mole percent phenyltrichlorosilane, 42.5 mole percent dimethyldichlorosilane and 22.5 mole percent diphenyldichlorosilane and had the average formula:

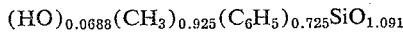

$$(HO)_{0.0688}(CH_3)_{0.925}(C_6H_5)_{0.725}SiO_{1.091}$$

The silanol groups were distributed so that each molecule of the resin contained at least two groups. A solution containing 0.84 gm. of the silicone resin, 0.84 milligram of tetramethylammonium acetate, 0.21 gm. of the ladder polymer, and 0.80 gm. of diphenylether dissolved in toluene was gently warmed to evaporate most of the toluene. The container was then covered and heated for 30 minutes in a 90° C. oven. The diphenyl ether, which functioned both as a cosolvent and as a rate moderator, was partially volatilized, but some remained in the residue. The resulting resin film was slightly flexible and tack-free, with a very slight haze. This product was thoroughly extracted with benzene, leaving a block copolymer which was a clear, hard, flexible cross-linked resin. About 25 mole percent of the silicon atoms in the copolymer were in blocks corresponding to the "A" units in Formula 5 when R is phenyl and $n$ has the average value of 60 and the remaining silicon atoms were in blocks derived from the starting silicone resin.

*Example IX*

In this example a silanol-stopped polydimethylsiloxane fluid having an intrinsic viscosity in benzene at 25° C. of 0.15 dl./g. was reacted with the phenyl ladder polymer segments of Example VII having an intrinsic viscosity in benzene at 25° C. of 0.11 dl./g. The siloxane fluid averaged about 320 silicon atoms per chain. A solution of the two polymers was refluxed in benzene for 45 minutes, as in Example VIII, after which it was freed of benzene. The product was fractionated by hexane into two block-copolymers within the scope of the present invention. The first was a hard, waxy copolymer having an intrinsic viscosity in benzene at 25° C. of 0.54 dl./g. The second was an oily copolymer having an intrinsic viscosity, under the same conditions, of 0.27 dl./g.

*Example X*

A longer silanol-stopped polydimethylsiloxane fluid and longer hydroxyl-terminated ladder polymer segments were used in this example. The fluid contained about 540 silicon atoms per average chain while the ladder polymer was that employed in Example VI. Reaction under the same conditions as in Example IX produced a hexane-soluble block copolymer gum within the scope of the present invention having an intrinsic viscosity in benzene at 25° C. of 0.57 dl./g. The product had a combination of tack and lubricity and, as with the polymer of Example IX, formed very stable foams in benzene solution, indicating a pronounced surface activity.

While the foregoing examples have illustrated a number of embodiments of my invention, it should be understood that the present invention is directed broadly to block copolymers containing at least two blocks derived from the arylsilsesquioxane ladder polymer segments of Formula 1 and at least one block derived from an organosilicon compound of Formula 2 or Formula 3. It is apparent from the foregoing description of the preparation of such block copolymers that the block copolymers are prepared by reacting the ladder polymer segments of Formula 1 with the organosilicon compound of Formula 2 or Formula 3. This reaction involves the silicon-bonded hydroxyl groups of the ladder polymer segments and the silicon-bonded X groups of the organosilicon compound, with the splitting off of the compound HX and the formation of the copolymer by the formation of siloxane linkages between the block derived from the ladder polymer segments and the block derived from the organosilicon compound.

From this description, it is seen that the block copolymers will contain the terminal atoms which were present in the reactant from which the terminal blocks were formed. Thus, if the terminal blocks are derived from ladder polymer segments, the terminal atoms will be the silicon-bonded hydroxyl groups. On the other hand, if the terminal blocks are derived from an organosilicon compound, the terminal atoms will be the X groups, either hydroxyl or chloride, depending upon the starting reactant.

While the preceding examples have described the preparation of a number of types of block copolymers, it should be understood that any other block copolymers can be prepared within the scope of the present invention. These different block copolymers are prepared by varying the starting materials employed in preparing the block copolymers.

The block copolymers within the scope of the present invention are useful in a number of areas. For example, such materials are valuable as insulation for electrical conductors. Thus, these materials can be applied to electrical conductors by forming solutions, for example benzene solutions, of the block copolymers and passing the wire through such solutions in a conventional wire tower and evaporating the solvent. This results in electrical conductors which exhibit particular utility for operation at elevated temperatures. Likewise, many of the block copolymers of the present invention have surface active properties and are useful as surfactants. All are useful as release coatings for application to the surface of paper to prevent the adhesion to the paper of materials which normally adhere thereto. Application to the paper is effected by dipping the paper into a solution of the block copolymers and thereafter evaporating the solvent.

What I claim as new and desire to secure by Letters Patent of the United States is:

1. A block copolymer comprising blocks of (A) joined by siloxane linkages to blocks of (B), where (A) is the condensation product of reaction of a hydroxyl-terminated polymer of the formula,

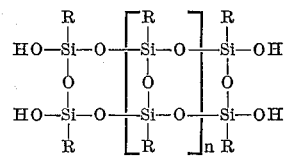

which is the product of hydrolysis of an arylsilsesquioxane polymer having an intrinsic viscosity in benzene of 25° C., of at least 0.1 dl./g., said hydrolysis being carried out in the presence of a basic amine catalyst, and a cosolvent for said arylsilsesquioxane polymer and water, and (B) is the condensation product of reaction of a polydiorganosiloxane of the formula, $$X[(R')_2SiO]_m(R')_2SiX$$

R is aryl, R' is a member selected from the class consisting of monovalent hydrocarbon radicals, halogenated monovalent hydrocarbon radicals, and cyanoalkyl radicals, X is a member selected from the class consisting of a halogen radical and a hydroxy radical, $n$ has a value of from about 25 to about 500, inclusive, and $m$ is an integer equal to 1 to 1,000, inclusive.

2. The composition of claim 1 in which R is phenyl.
3. The composition of claim 1 in which R is phenyl and R' is methyl.

References Cited by the Examiner
UNITED STATES PATENTS

| | | | |
|---|---|---|---|
| 2,482,276 | 9/1949 | Hyde et al. | 260—46.5 |
| 3,000,858 | 9/1961 | Brown | 260—46.5 |
| 3,017,385 | 1/1962 | Sprung et al. | 260—46.5 |
| 3,017,386 | 1/1962 | Brown et al. | 260—46.5 |
| 3,162,614 | 12/1964 | Katchman | 260—46.5 |

LEON J. BERCOVITZ, *Primary Examiner.*

M. I. MARQUIS, *Assistant Examiner.*